April 6, 1965  A. ENGELMANN  3,176,979
APPARATUS FOR GRIPPING AND RELEASING OBJECTS MADE
OF MATERIALS ADAPTED TO BE PIERCED BY NEEDLES
Filed Feb. 19, 1963  4 Sheets-Sheet 1
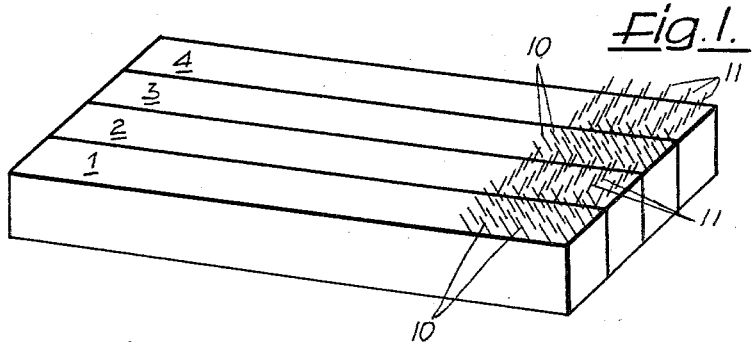
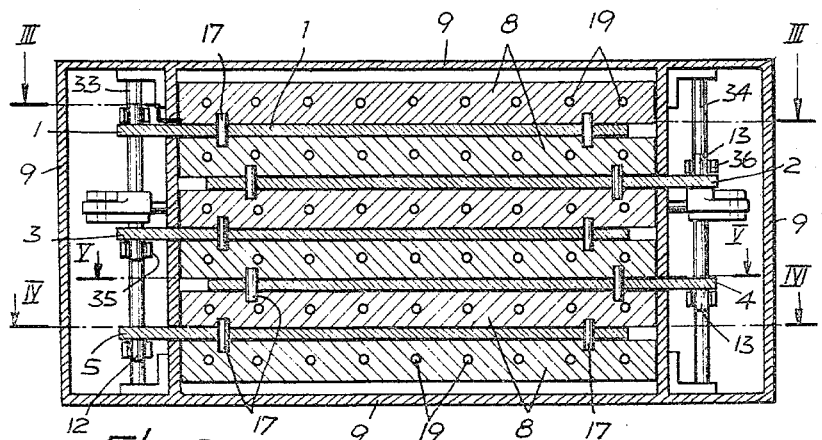
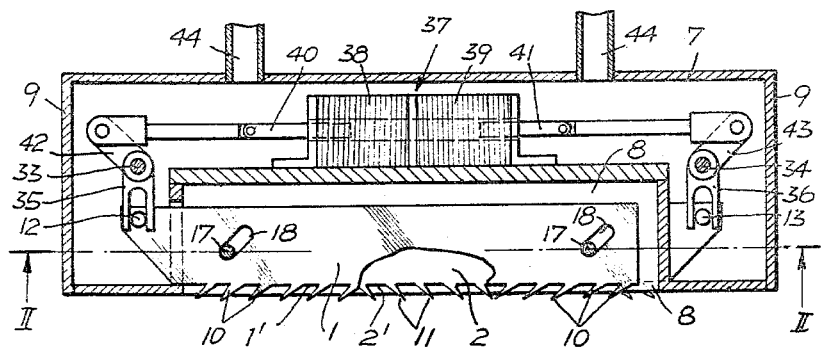
INVENTOR
Alfred Engelmann
BY
ATTORNEY

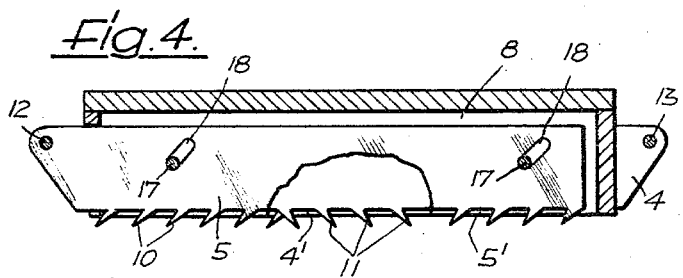
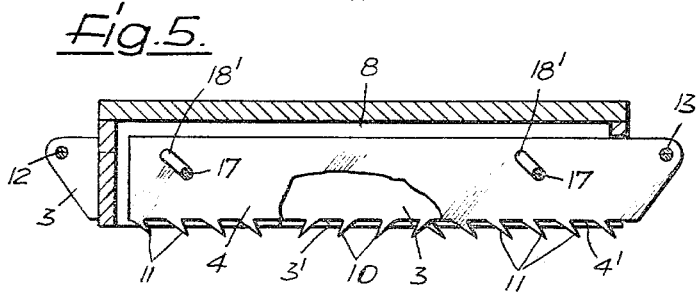
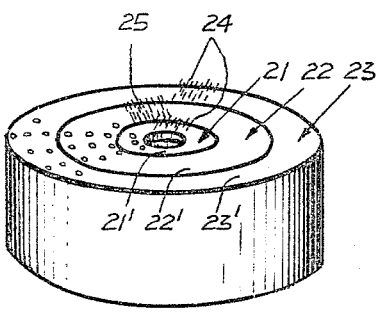

April 6, 1965 A. ENGELMANN 3,176,979
APPARATUS FOR GRIPPING AND RELEASING OBJECTS MADE
OF MATERIALS ADAPTED TO BE PIERCED BY NEEDLES
Filed Feb. 19, 1963 4 Sheets-Sheet 4
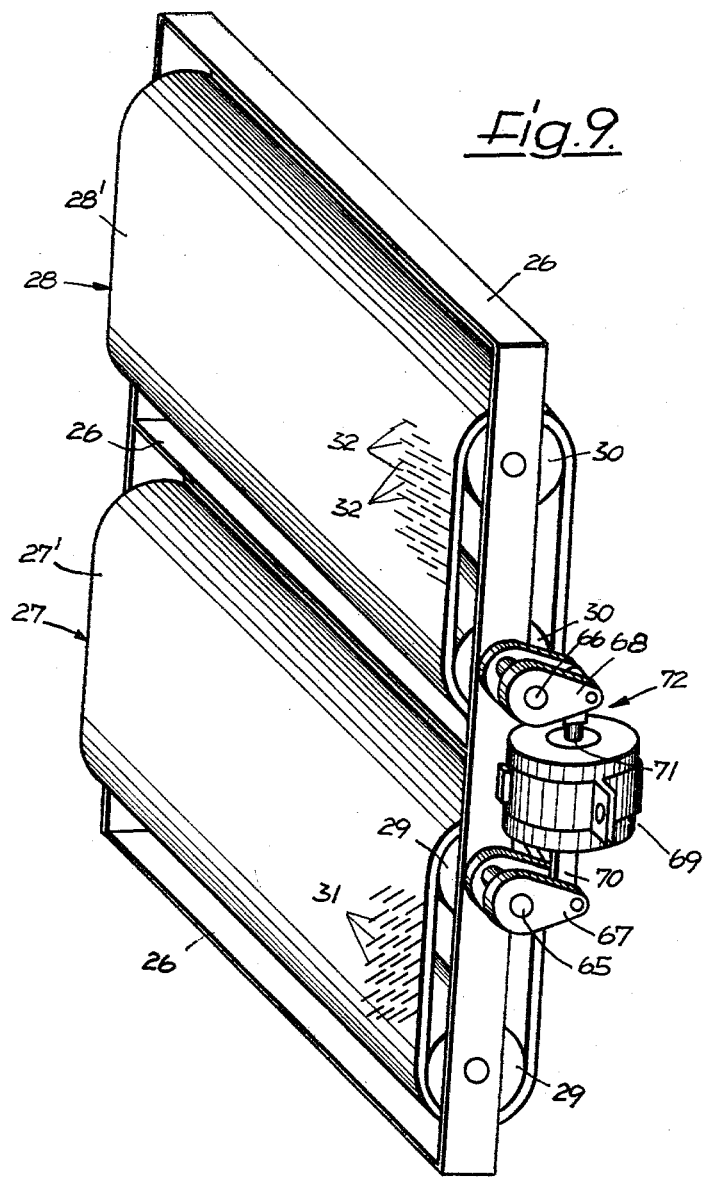
INVENTOR
Alfred Engelmann
BY
ATTORNEY United States Patent Office 3,176,979
Patented Apr. 6, 1965

3,176,979
APPARATUS FOR GRIPPING AND RELEASING OBJECTS MADE OF MATERIALS ADAPTED TO BE PIERCED BY NEEDLES
Alfred Engelmann, Iznang, Germany, assignor to Trikotfabriken J. Schiesser A.G., Radolfzell (Bodensee), Germany, a corporation of Germany
Filed Feb. 19, 1963, Ser. No. 259,606
Claims priority, application Germany, Feb. 21, 1962, T 21,629
10 Claims. (Cl. 271—18)

The present invention relates to an apparatus for gripping and releasing objects, each having at least one surface consisting of a material, for example, a woven or knitted fabric, which is adapted to be pierced by needles or the like.

It has always been rather difficult to grip and release individual layers of materials, for example, woven or knitted fabrics. This has usually been done in the past by means of suction devices which, however, operate very uneconomically since the porosity of the materials requires a very high suction output.

It is an object of the invention to provide an apparatus for gripping and picking up objects or materials of the above-mentioned type and for again releasing the same, which apparatus carries out its functions much more reliably and economically than the apparatus which were previously known for this purpose, and which may be employed, for example, for picking up individual layers of material from a stack thereof and for then depositing these layers on a conveyor belt. The apparatus according to the invention may be manipulated by hand, in which case it may be provided with suitable handles, or it may be installed either on a special mechanism for swiveling the picked-up material or object or also for lifting and lowering it or on a conveying mechanism.

The apparatus according to the invention for gripping and picking up objects, each of which has at least one surface consisting of a material which is adapted to be pierced by needles or the like comprises in principle a holding element which is that part of the apparatus which may either be provided with handles for manipulating the apparatus or may be installed in a swiveling mechanism or in a mechanism for lifting and lowering the picked-up material and object, or in a conveying mechanism. The apparatus further comprises two groups of needle supports, each of which comprises at least one such support, and which are movably connected to the holding element. Each of these needle supports has a work surface within the same plane as that of the other needle support or supports, and each of these work surfaces is provided with sharp pointed projections such as needles, serrations, or the like (all of which are hereafter included in the term "needles") which are capable of piercing, for example, a knitted or woven fabric. These needles project a uniform length from the work surfaces of both groups of needle supports, and the planes of the needles of both groups and the planes of movement of these needles are substantially parallel to each other. The needles of the first group extend at a substantially uniform oblique angle from at least one work surface and the needles of the second group also project from at least one work surface at a substantially uniform oblique angle which, however, is inversely symmetrical to the angle of the needles of the first group.

The apparatus according to the invention further comprises a mechanism for reciprocating the two groups of needle supports in opposite directions to each other so that, when the adjacent needle supports are moved away from each other the two needle groups move relative to each other from an inactive position of the needles to the gripping position while when the adjacent needle supports are moved toward each other, the two needle groups move relative to each other from the gripping position to the inactive position.

When a certain object or a part thereof with a surface which is adapted to be pierced by needles is to be gripped or picked up, the apparatus is placed upon the surface while the needles are in the inactive position. As soon as the needles on the two groups of supports are then moved away from each other, the needles—because of their different angles—will pierce the surface and tighten the same so that the material or object will thus be firmly gripped by the needles and may then be picked up and taken by the apparatus to another place where the material may be released from the apparatus by a movement of the needles on the two groups of supports toward each other.

If only the upper layer of a material is to be lifted from a stack of such layers, it may occur—even though the needles on the needle supports are so short as not to penetrate beyond this layer—that the second layer will also be lifted due to its surface adhesion to the first layer. In order to avoid this, the invention further provides the needle supports with air outlet openings terminating at the work surface thereof through which compressed air may be passed which then penetrates through the top layer and blows off the second layer without disconnecting the top layer from the needles since it is firmly gripped by the latter. This ejection device may, of course, also be used to facilitate and insure the removal of the layer from the needles when the two groups of needle supports are moved toward each other.

The features and advantages of the present invention will become more clearly apparent from the following detailed description thereof which is to be read with reference to the accompanying drawings, in which—

FIGURE 1 shows diagrammatically the basic principle of operation of the apparatus according to the invention;

FIGURE 2 shows a horizontal section taken along line II—II of FIGURE 3 of an apparatus according to a first embodiment of the invention;

FIGURE 3 shows a vertical section taken along line III—III of FIGURE 2;

FIGURE 4 shows a partial section taken along line IV—IV of FIGURE 2;

FIGURE 5 shows a partial section taken along line V—V of FIGURE 2;

FIGURE 6 shows diagrammatically the principle of operation of an apparatus according to a modification of the invention;

FIGURE 8 shows a bottom view of the apparatus according to FIGURE 7; while

FIGURE 9 shows a perspective view of an apparatus according to a further modification of the invention.

Figure 7:
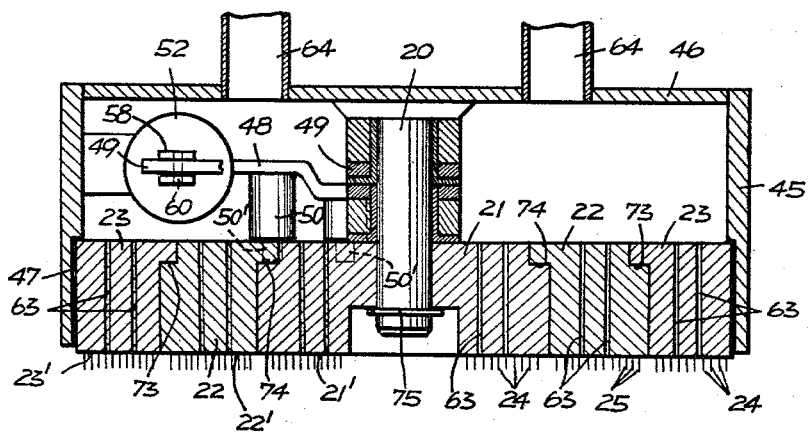
FIGURE 7 shows an axial section taken along line VII—VII of FIGURE 8 of an apparatus operating according to the principle as illustrated in FIGURE 6.

The apparatus according to the invention operates on the principle as illustrated in FIGURE 1 and generally consists of several adjacent needle supports 1 to 4 which are movable in opposite directions relative to each other and the work surfaces of which extending with a common plane are completely studded with needles or the like 10 and 11. The needles 10 project from the work surfaces of the supports 1 and 3 at a uniform angle in one longitudinal direction of the supports and the needles 11 project from the work surfaces of the supports 2 and 4 at a similar angle in the opposite longitudinal direction. If these supports are placed with their needle points, for example, on a layer of cloth, the needles will at least slightly prick the cloth because of the weight of the device. However, if the individual needle supports are then not shifted longitudinally relative to each other, most of the needles will again disengage from the cloth when the device is moved vertically away from it and the cloth will therefore not be picked up and taken along reliably or uniformly by the device. The device according to the invention is therefore designed to permit the adjacent needle supports to be shifted slightly in opposite directions to each other so that the needles 10 and 11 will penetrate into the cloth layer and exert a spreading or tightening effect thereon and thereby firmly grip the cloth layer. If the cloth is again to be disengaged from the device, the adjacent needle supports are moved in the opposite direction relative to each other.

An apparatus which operates according to the principle of the device as described above and shown in FIGURE 1 is illustrated in FIGURES 2 to 5. It comprises a frame 9 which has a bottom 7. The open side of this frame 9 is traversed by parallel webs 8 which are equally spaced from each other and the outer surfaces of which are flush with the outer surface of frame 9 at the side of its opening. Between each pair of adjacent webs 8, one of the flat needle-supporting strips 1 to 5 is slidably mounted, the work surfaces 1' to 5' of which lie within a common plane and are provided with pointed serrations or needles 10 or 11, respectively. Needles 10 on the alternate needle strips 1, 3, and 5 are equally inclined in one longitudinal direction of these strips, while needles 11 are equally inclined in the opposite direction.

The driving means for reciprocating the needle strips 1 to 5 are designed so as to move each strip obliquely to its longitudinal direction from the inside of frame 9 toward its open side. For guiding the needle strips 1 to 5 in such oblique directions, each strip is provided near its opposite ends with a pair of parallel oblique slots 18 or 18' through which pins 17 extend, all of which lie within the same plane and the ends of which are secured in the two webs 8 adjacent to each strip 1 to 5. As shown in FIGURES 4 and 5, slots 18 and 18' in the adjacent needle strips 1 to 5 extend inversely symmetrically to each other and parallel to the axes of needles 10 or 11 of the particular strip, and they are disposed in such positions that, when strips 1 to 5 are moved inwardly to their inactive positions, the work surfaces of the strips from which the needles 10 or 11 project will be located within frame 9.

The actual driving means for strips 1 to 5 comprise a pair of shafts 33 and 34 which extend at right angles to webs 8 and are rotatably mounted in frame 9 outwardly of the ends of the webs, and each of the shafts has secured thereto the bifurcated members 35 and 36, respectively. The bifurcated members 35 on shaft 33 embrace pins 12 on one outer end of needle strips 1, 3, and 5, in which the slots 18 extend obliquely in one direction, while members 36 on shaft 34 embrace pins 13 on the opposite outer end of needle strips 2 and 4 in which the slots 18 extend obliquely in the other direction. One of the webs 8 carries an electromagnet 37 which comprises a pair of coaxial coils 38 and 39 which are adapted to be magnetized in the same direction and also in opposite directions, and a rod-shaped core 40 or 41 in each coil and projecting therefrom. The outer end of core 40 is pivotally connected to a lever 42 which is secured to the first shaft 33, while the outer end of core 41 is pivotally connected to a lever 43 which is secured to the second shaft 34. If coils 38 and 39 are magnetized in the same direction, cores 40 and 41 will be moved inwardly toward each other and if the coils are magnetized in opposite directions, cores 40 and 41 will be moved outwardly. Thus, needle strips 1, 3, and 5 forming one group will be moved relative to needle strips 2 and 4 of the other group, and those of each group will then be moved obliquely downwardly and again upwardly, for example, in a direction at right angles to the movement of the strips of the other group. Needles 10 and 11 of the two groups of strips therefore either move away from each other when moving out of frame 7 or toward each other when moving into frame 7. In the latter case, needles 10 and 11 may be retracted entirely or almost entirely behind the outer surfaces of webs 8 so that a layer of cloth which was attached to the needles will be stripped off therefrom.

Webs 8 may be provided with bores 19, as shown in FIGURE 2, and the bottom 7 of frame 9 with a pair of pipe sockets 44, as shown in FIGURE 3. An air-pressure line may then be connected to sockets 44 to pass a blast of compressed air through bores 19 and upon the cloth on needles 10 and 11 to facilitate and insure the removal of the cloth from the needles during the inward movement of the latter.

FIGURE 6 illustrates diagrammatically the manner of operation of a second embodiment of the invention in which the supports for the needles 24 and 25 consist of concentric cylindrical rings 21, 22, and 23, the work surfaces 21', 22', and 23' of which lie within the same plane. Each of the needles 24 and 25 projects obliquely from the respective work surface within a plane which extends tangentially to a circle which is drawn about the axis of shaft 20 and passes through the base of the needle on the work surface. The adjacent rings are adapted to be turned back and forth about their common axis in opposite directions to each other so that one group of rings formed by the two rings 21 and 23 may be turned together in one direction, while the other group which in the particular example as illustrated consists of only one ring 22 is turned in the opposite direction. Needles 24 of one group of rings are accordingly inclined in one direction and needles 25 of the other group of rings in the other direction so that, when the two groups of rings are turned relative to each other, the needles thereon either move away from or toward each other and thereby either penetrate into the cloth or disengage therefrom.

Figure 8:
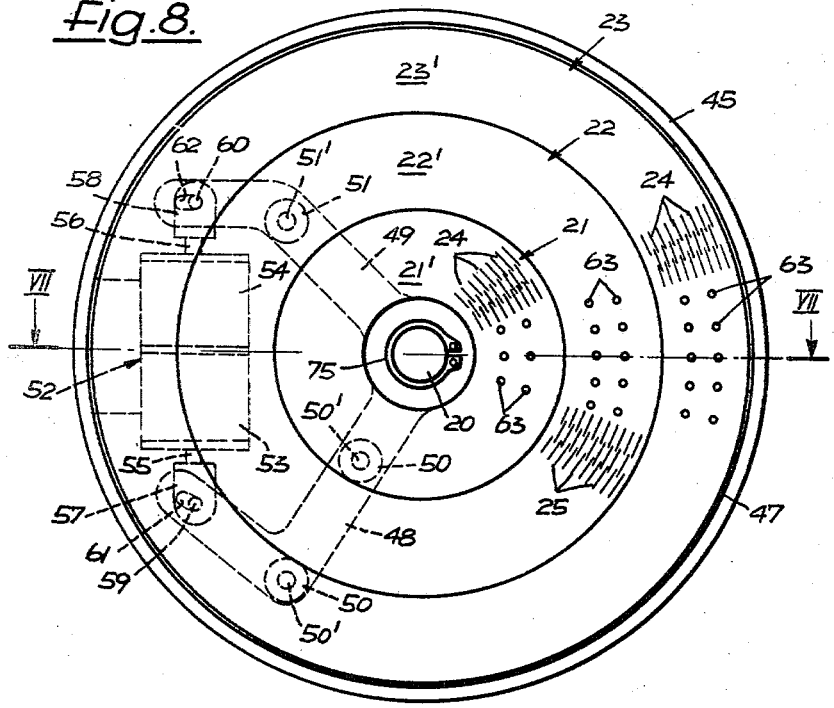

An apparatus which operates according to the principle of the device as described above and shown in FIGURE 6 is illustrated in FIGURES 7 and 8. It comprises a cylindrical housing 45 which has a bottom 46 on which a shaft 20 is centrally secured. The needle supports consist of concentrical cylindrical rings 21, 22, and 23 which are rotatable about the axis of shaft 20 relative to each other, and they fill out the annular space at the open side of housing 45 between the wall of the latter and shaft 20. The outer ring 23 is guided within an annular groove 47 in the wall of housing 45; all three rings 21, 22, and 21, 22, and 23 guide each other by means of corresponding annular flanges and shoulders 73 and 74, and the inner ring 21 is rotatably mounted on shaft 20 and held thereon by a spring ring 75 which is inserted into an annular groove in the end of shaft 20. The outer sides of rings 21, 22, and 23 forming work surfaces 21', 22', and 23' lie within the same plane outside of the housing 45 and are completely studded with needles 24 and 25 which are arranged in the manner as already described with reference to FIGURE 6.

Housing 45 further contains a pair of levers 48 and 49 which are rotatably mounted on shaft 20 and extend substantially radially therefrom. Lever 48 carries a pair of pins 50 which extend parallel to shaft 20 and the reduced ends 50' of which are rotatably mounted in corresponding bores in rings 21 and 23. Lever 49 also has a pin 51 secured thereto which likewise extends parallel to shaft 20 and has a reduced end 51' rotatably mounted in a corresponding bore in ring 22. Housing 45 further contains an electromagnet 52 which is of the same construction and functions in the same manner as the magnet 37 in FIGURE 3 and consists of a pair of coaxial coils 53 and 54 which are adapted to be magnetized in the same direction and also in opposite directions, and of a core 55 or 56 in each of these coils. Core 55 is pivotably connected to the lever 48 and core 56 to the lever 49, and each of them is thus connected by a bifurcated member 57 or 58 on the end of core 55 and 56, respectively, through which a pin 59 or 60 extends which passes through a slot 61 or 62 in the end of lever 48 or 49 which is inserted between the two arms of the bifurcated member 48 or 49, respectively.

For pushing the cloth or fabric off the needles 24 and 25 when the two groups are moved toward each other this apparatus may also be provided with a compressed-air ejection device. For this purpose, rings 21, 22, and 23 are provided with bores 63 extending parallel to the axis of shaft 20, while the bottom 46 of housing 45 is provided with a pair of pipe sockets 64 to which a compressed-air line may be connected.

FIGURE 9 illustrates a third embodiment of the invention. This apparatus comprises a holding element in the form of a frame 26 in which four parallel guide rolls 29 and 30 are mounted. Guide rolls 29 carry an endless belt 27 and guide rolls 30 a similar belt 28. Belts 27 and 28 which may consist of a fabric or of metal are movable back and forth in opposite directions to each other and carry needles 31 and 32 projecting obliquely from their outer surfaces 27' and 28' and on each belt at similar angles in the opposite direction to the needles on the other belt.

The apparatus according to FIGURE 9 further comprises a driving mechanism 72 for moving both belts for a limited distance back and forth in opposite directions to each other. This driving mechanism consists of a pair of levers 67 and 68 which are secured to the respective shafts 65 and 66 of guide rolls 29 or 30 of belts 27 and 28, respectively, and of an electromagnet 69 which is secured to the frame 26 and is provided similarly as magnets 37 and 52 according to FIGURES 3, 7 and 8, with a pair of coils which may be magnetized in the same direction and also in opposite directions, and with a core 70 or 71 in each coil which, when the coils are magnetized in the same direction, are movable into the coils but outwardly when the coils are magnetized in opposite directions. Core 70 is pivotably connected to a lever 67 and core 71 to a lever 68, for example, in the same manner as cores 55 and 56 according to FIGURES 7 and 8 are pivotably connected to the levers 48 and 49.

By this mechanism it is therefore possible to move the two sets of needles 31 and 32 on the adjacent surfaces of different belts in the direction away from each other from the inactive position to the active or gripping position and, vice versa, toward each other from the gripping position to the inactive position.

From the above description of the three different embodiments of the invention it is evident that their principles of operation are identical.

Also the third embodiment according to FIGURE 9 permits the cloth or fabric to be more easily separated from the pins 31 and 32 on the endless belts 27 and 28 when the latter are moved toward each other by providing the work surfaces of these belts with air outlet openings. For this purpose, each of the two belts 27 and 28 may be made in the form of a flat endless hose which is completely closed except for these air outlet openings and one or two inlet openings through which compressed air may be passed into the hose.

The different apparatus according to the invention do not require the surfaces of the materials which are to be picked up and again released to be level, but either of these apparatus will also carry out its functions if the surfaces of the material are slightly uneven or curved. Even if these surfaces are considerably curved, it is possible to modify the shape of the apparatus in accordance with these surfaces. Thus, for example, the first embodiment of the invention according to FIGURES 1 to 5 may be modified by making the work surfaces carrying the needles of a circular shape and by moving the needle supports relative to each other about the center of the circle. The third embodiment of the invention according to FIGURE 9 may also be modified accordingly, for example, by mounting the two pin-studded belts in a manner so that the plane which extends through the axes of the guide rolls of one belt is disposed at an angle to the plane which extends through the axes of the guide rolls of the other belt.

Although my invention has been illustrated and described with reference to the preferred embodiments thereof, I wish to have it understood that it is in no way limited to the details of such embodiments, but is capable of numerous modifications within the scope of the appended claims.

I claim:

1. An apparatus for gripping and releasing an object having at least one surface consisting of a material adapted to be pierced by needles, said apparatus comprising a holding element, a plurality of needle supports movably mounted on said holding element and each having a work surface, a plurality of needles forming two groups on said needle supports and projecting at a uniform length from all of said work surfaces and each needle group being movable by said needle supports relative to the other needle group, the planes of said needles of both groups and the planes of movement of said needles of both groups being substantially parallel to each other, each of said needle groups comprising a plurality of rows of said needles, the first needle group projecting at a substantially uniform oblique angle from at least one first of said work surfaces and the second needle group projecting from at least one second of said work surfaces at a substantially uniform oblique angle inversely symmetrical to the angle of said first needle group, means for reciprocating the adjacent needle supports in opposite directions to each other so that, when said adjacent needle supports are moved away from each other, the two needle groups move relative to each other from an inactive position to a gripping position, and when the adjacent needle supports are moved toward each other, the two needle groups move relative to each other from the gripping position to the inactive position.

2. An apparatus for gripping and releasing an object having at least one surface consisting of a material adapted to be pierced by needles, said apparatus comprising a housing having a bottom and side walls and one open side opposite to said bottom, a plurality of parallel guiding webs equally spaced from each other and secured to said housing and traversing the open side thereof and having outer surfaces flush with the outer surface of said housing at said open side thereof, a plurality of needle-supporting strips having work surfaces disposed within a common plane and each of said strips being disposed between and slidably guided by two of said guiding webs, the adjacent strips forming two groups, each movable in opposite directions to the other group, a plurality of needles secured to said strips and projecting at a uniform length from all of said work surfaces, said needles forming two groups, each needle group being movable by said needle supports relative to the other needle group, the planes of said needles of both groups being substantially parallel to each other, the first needle group projecting at a substantially uniform oblique angle from the work surfaces of the first group of strips and the second needle group projecting from the work surfaces of the second group of strips at a substantially uniform oblique angle inversely symmetrical to the angle of said first needle group, both of said needle groups being obliquely inclined in the longitudinal direction of said strips, means for reciprocating said two groups of strips relative to each other substantially in the directions of the needles thereon so that, when the two needle groups are moved in one direction relative to each other they move away from each other from an inactive position in which they are substantially retracted into said housing to a gripping position in which they project from said housing, while when the two needle groups are moved in the opposite direction relative to each other, they move toward each other from the gripping position to the inactive position.

3. An apparatus as defined in claim 2, in which said means for reciprocating said two groups of strips relative to each other comprise a pair of parallel shafts rotatably mounted in said housing at the opposite ends of said webs and extending at right angles to the longitudinal direction of said webs and needle strips, a pin secured to one end of each strip of one group and a pin secured to the opposite end of each strip of the other group, bifurcated members secured to each shaft and each embracing one of said pins, a pair of levers each secured at one end to one of said shafts, an electromagnet mounted in said housing and having two coaxial coils adapted to be magnetized in the same direction and in opposite directions, a pair of cores, each slidable in one of said coils and projecting therefrom and adapted to be moved toward the inside of its coil when said coils are magnetized in the same direction and to be moved toward the outside of its coil when said coils are magnetized in opposite directions, the outer end of each of said cores being pivotably connected to the other end of one of said levers, each of said needle strips having at least two slots extending obliquely in a direction substantially parallel to the direction of said needles on said strip, and a plurality of pins for guiding said strips disposed within a common plane and each extending through one of said slots transversely to the longitudinal direction of said webs and strips, the opposite ends of said pins being secured in the adjacent webs, said pins and slots being disposed in such a position that, when said pins engage with one end of said slots, the work surfaces of said strips are disposed in said inactive position within said housing, said slots having a length to determine the extent of the movement of said strips from the inactive position to the gripping position of said needles.

4. An apparatus as defined claim 2, in which each of said webs has a plurality of bores extending therethrough, and means for connecting an air-pressure line to said housing for blowing compressed air through said bores upon the surface of the material gripped by said needles to insure that, when said needles are moved to said inactive position, said material will be disengaged from said needles.

5. An apparatus for gripping and releasing an object having at least one surface consisting of a material adapted to be pierced by needles, said apparatus comprising a hollow cylindrical housing having a bottom at one end and an open side opposite to said bottom, a shaft mounted on said bottom centrally within said housing, a plurality of coaxial cylindrical rings of different diameters rotatably mounted on said shaft and on each other within said housing and closing the open side thereof, the sides of said rings facing the outside being disposed within a common plane, projecting from said housing and forming work surfaces, each of said rings being adapted to be turned back and forth about its axis in a direction opposite to the direction of rotation of the adjacent ring, those of said rings adapted to be turned in one direction forming a first group and those of said rings adapted to be turned in the opposite direction forming a second group, a plurality of needles secured to said rings and projecting at a uniform length from the work surfaces thereof and each needle projecting obliquely from the respective work surface within a plane extending tangentially to a circle about the axis of said shaft and passing through the base of the needle on the work surface, said needles on each group of rings being inclined at an oblique angle inversely symmetrical to the angle of the needles on the other group of rings, and means for turning each group of rings back and forth in a direction opposite to the direction of rotation of the other group so that, when said rings of one group are turned in one direction relative to the rings of the other group, the needles thereon move toward the needles on the other group from an inactive to a gripping position and when said rings of both groups are turned in the opposite directions, the needles thereon move from the gripping position to the inactive position.

6. An apparatus as defined in claim 5, in which said means for turning said rings comprise a pair of levers within said housing mounted on and rotatable about said shaft and extending substantially radially therefrom in different directions, means for pivotably connecting each of said rings of said first group to one end of one of said levers and each of said rings of said second group to the other lever, and an electromagnet mounted in said housing and having two coaxial coils adapted to be magnetized in the same direction and in opposite directions, and a pair of cores each slidable in one of said coils and projecting therefrom and adapted to be moved toward the inside of its coil when said coils are magnetized in the same direction and to be moved toward the outside of its coil when said coils are magnetized in opposite directions, the outer end of each of said cores being pivotably connected to the other end of one of said levers.

7. An apparatus as defined in claim 5, in which each of said rings has bores extending therethrough substantially parallel to the axis of said shaft and means for connecting an air-pressure line to said housing for blowing compressed air through said bores upon the surface of the material gripped by said needles to insure that, when said needles are moved to said inactive position, said material will be disengaged from said needles.

8. An apparatus for gripping and releasing an object having at least one surface consisting of a material adapted to be pierced by needles, said apparatus comprising a housing having a bottom, a side wall construction and one open side opposite to said bottom, a plurality of needle-supports having work surfaces disposed in a common plane and forming two groups of needle-supports, each of said groups being movable in opposite direction to the other of said groups, one of said groups containing at least one needle-support, the other of said groups containing at least two needle-supports, the needle supports of both groups being alternatively arranged within said housing and being adapted to be moved so that one support of one of said groups is moved in opposite directions to one adjacent support of the other of said groups, a plurality of needles secured to said work surfaces and projecting at a uniform length from all of said work surfaces and being arranged in adjacent rows, the needles of the first of said groups of needle supports projecting at a substantially uniform oblique angle from the work surfaces of the first of said groups of needle supports and the needles of the second of said groups of needle supports projecting from the work surfaces of the second of said groups of needle supports at a substantially uniform oblique angle inversely symmetrical to the angle of the needles of said first of said groups of needle supports, and means for reciprocating said two groups of needle supports relative to each other substantially in the direction of said needle rows thereof, so that when adjacent needle supports are moved in one direction relative to each other they move away from each other from an inactive position to a gripping position, while when adjacent needle supports are moved in the opposite direction relative to each other they move toward each other from the gripping position to the inactive position.

9. An apparatus for gripping and releasing an object having at least one surface consisting of a material adapted to be pierced by needles, said apparatus comprising a frame, two pairs of parallel guide cylinders rotatably mounted within said frame, an endless belt applied to each corresponding pair of said guide cylinders, one of said belts being movable in a direction opposite to the other of said belts, one end of each of said belts being disposed in a common plane and forming a plane working surface adapted to cover the surface of the object to be pierced, a plurality of needles secured to and projecting at a uniform length from the outer surfaces of said belts and covering the total outer surfaces of said belts, the needles of each of said belts projecting uniformly at an oblique angle in a direction away from those of the other of said belts, and means for reciprocating each pair of guide cylinders and the corresponding of said belts thereon to a limited extent relative to the other pair of guide cylinders and the corresponding of said belts thereon to move said needles on each of said belts away from the needles on the other of said belts from an inactive position to a gripping position and to move the needles on each of said belts toward the needles of the other of said belts from the gripping position to the inactive position, respectively.

10. An apparatus as defined in claim 9, in which said means for reciprocating said guide rolls and belts comprise an electromagnet mounted on said frame and having two coaxial coils adapted to be magnetized in the same direction and in opposite directions, a pair of cores each slidable in one of said coils and projecting therefrom and adapted to be moved toward the inside of its coil when said coils are magnetized in the same direction and to be moved toward the outside of its coil when said coils are magnetized in opposite directions and a pair of levers each secured at one end to one roll of each pair of guide rolls and pivotably connected to the outer end of one of said cores.

References Cited by the Examiner
UNITED STATES PATENTS

| | | | |
|---|---|---|---|
| 793,009 | 6/05 | Miller | 271—18 |
| 2,619,175 | 11/52 | Gottlieb | 271—18 X |

SAMUEL F. COLEMAN, *Primary Examiner.*

RAPHAEL M. LUPO, *Examiner.*